(12) United States Patent
Wilmer

(10) Patent No.: US 10,901,952 B2
(45) Date of Patent: Jan. 26, 2021

(54) METHOD FOR TRANSFERRING A DIFFERENCE FILE

(71) Applicant: Visteon Global Technologies, Inc., Van Buren Township, MI (US)

(72) Inventor: Thorsten Wilmer, Bruchsal (BE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 186 days.

(21) Appl. No.: 15/686,829

(22) Filed: Aug. 25, 2017

(65) Prior Publication Data

US 2018/0060349 A1    Mar. 1, 2018

(30) Foreign Application Priority Data

Aug. 25, 2016  (DE) .................. 10 2016 115 792

(51) Int. Cl.
*G06F 16/178*    (2019.01)
*G06F 16/17*    (2019.01)
*G06F 11/10*    (2006.01)

(52) U.S. Cl.
CPC ........ *G06F 16/178* (2019.01); *G06F 11/1004* (2013.01); *G06F 16/1734* (2019.01)

(58) Field of Classification Search
None
See application file for complete search history.

(56) References Cited

U.S. PATENT DOCUMENTS

| 8,498,965 | B1 | 7/2013 | Ren et al. | |
|---|---|---|---|---|
| 8,813,061 | B2* | 8/2014 | Hoffman | G06F 8/65 717/168 |
| 9,098,513 | B1* | 8/2015 | Ren | G06F 16/10 |
| 2003/0028867 | A1* | 2/2003 | Kryloff | G06F 8/658 717/171 |
| 2009/0254897 | A1 | 10/2009 | Segalov | |
| 2010/0138827 | A1 | 6/2010 | Frank et al. | |
| 2010/0318983 | A1* | 12/2010 | Hung | G06F 8/654 717/168 |
| 2012/0330910 | A1 | 12/2012 | Volkoff et al. | |
| 2014/0250066 | A1* | 9/2014 | Calkowski | H04L 67/06 707/624 |
| 2016/0210131 | A1* | 7/2016 | Vangelov | G06F 8/65 |
| 2017/0091086 | A1* | 3/2017 | Davis | G06F 16/11 |

FOREIGN PATENT DOCUMENTS

DE    102015110710 A1    1/2016

* cited by examiner

*Primary Examiner* — Hau H Hoang
(74) *Attorney, Agent, or Firm* — Quinn IP Law

(57) ABSTRACT

A system and method for generating a second file in a target using a first file and a difference file is provided. The system also provides for a method of transferring a difference file from a source device to the target device in a two or more partial blocks which may be transferred independently and which do not all need to be stored in the target device at any given time. The partial blocks of the subject system each include a plurality of segments, which may each function as a difference instruction to instruct the target device to generate a corresponding portion of the second file. Each of these segments may include a reference to source data within the first data or a reference to new plain data that is provided within the partial block. In this way, the second file may be accurately constructed while minimizing the data transferred.

20 Claims, 6 Drawing Sheets

METHOD FOR TRANSFERRING A DIFFERENCE FILE

CROSS-REFERENCE TO RELATED APPLICATION

This U.S. patent application claims priority to German Patent Application No. 10 2016 115 792.9 filed Aug. 25, 2016 and entitled "METHOD FOR TRANSFERRING A DIFFERENCE FILE," which is herein incorporated by reference.

BACKGROUND

The invention relates to a method for transferring a difference file from a source device to a destination device, wherein the difference file contains differences between a first and a second file and is transmitted to the destination device, and wherein, by means of the difference file and the first file, the second file is generated in the target device.

For example, in many electronic devices that are controlled by their own processor (embedded devices), there is a need to download data for a software update in order to update the device software. Very often only low bandwidth, slow connections are available for such a data transfer, with which such an update of the device software takes an undesirably long time. Examples of such electronic devices include, for example, smartphones and other portable devices as well as control software in devices, appliances, and/or or vehicles.

Therefore, the necessity arises for a solution to reduce the data required for updating images or files that must be transferred to a target device such as, for example, a smartphone.

Several compression algorithms are known from the state of the art and are used to compress data, thus reducing their size. For example, they work through a reversible transformation and coding technique in order to reduce the size of the data before transferring the data.

Modern compression techniques such as the data compression algorithm "Brotli" known from the state of the art also use a dictionary, which is stored in both the sender and in the receiver and is used to reduce the amount of data to be transmitted. Such methods result in the reduction of data transmitted based on the fact that it can be simpler and faster to transmit a reference to the data instead of the data itself.

SUMMARY

The goal of the presented method is to transmit a difference file which describes the differences, for example, between a first and a second image, from a source device arranged on a transmitter side to a destination device arranged on a receiver side, wherein there is no need to save the complete difference file in memory of the target device before processing. Here, such a difference file generally includes the differences between a first file and a second file. The content of such files can, for example, be a program code, an image, a text, a video, a sound, or the like.

In addition, a system according to the present disclosure may tolerate an interruption in the data transfer between the source device and the target device in order to improve handling and allow the data transmission to resume for creating the remainder of the second image in the target device.

A system for updating stored firmware on electronic devices is known from US 2009/0254897 A1. This system includes an electronic device with the processor and a memory coupled with the processor, which keeps in memory a current image or version of the firmware.

The system works with an update utility, which contains instructions for a processor so that the electronic device, when installed in a corresponding electronic device, can establish a connection to an enveloping device.

This enveloping device has at least one memory for storing updates, a so-called firmware difference image, for updating the firmware in the electronic device to a newer version.

When the electronic device is connected to the enveloping device, the firmware of the electronic device is updated using the firmware difference image by means of an update utility, and this updated firmware is stored in the electronic device.

A method and a system for difference imaging of arranged dependent files are known from U.S. Pat. No. 9,098,513 B1. It is planned to create difference data between a reference file and a target file, whereby common blocks are this purpose are detected, which have data in the same serial order and the same reference and target files.

The difference data are recognized by a comparison of hash values of data blocks of the reference file with the hash values of parts of the target file and stored in a difference file. Thereby, it is possible to reconstruct a target file with a copy of the reference file and the difference data from the difference file in an end point computer.

A disadvantage in this state of the art is the fact that the complete difference file must be stored. In addition, references to the difference file are provided at the end of the difference file, which means that the difference file must always remain as a unit.

US 2010/138827 A1 describes a method for transferring data through a virtual machine on which data of stored images are to be transmitted.

In such virtual machines, images are transferred from a source storage location to a destination storage location over a network. In one embodiment, a host computer calculates, from the data stored at the source location, signature values from a plurality of disk blocks containing a plurality of virtual machine images. Each computed signature value corresponds to one of the disk blocks. A subgroup of the disk blocks, which all have different signature values, is then transferred from the source memory location to the destination memory location. Thus, only blocks which are not yet known in the destination memory location are transmitted over the network.

In a diff-algorithm known from U.S. Pat. No. 8,498,965 B1, the situation is exploited that the sender and receiver can access the old image, which is already stored on the receiver site. The stream of data consists of copy and data commands, which tell the receiver which of all the data to copy and/or which data are to be written anew. In such a stream of data, the possibility naturally exists of relevant coding of the data to be transmitted.

A problem exists with such implementations in that the entire difference file must be stored in the target device, such as a smartphone, before an update can be created and installed by means of this difference file. Complete storage in the target device on the receiver side is therefore required in such prior art systems, because the difference file contains new partial data in the area of the end of the file, or because before implementing the difference file, a review of the data for accuracy occurs by means of a check sum.

Thereby, it is necessary to set up a relatively large memory or interim memory for storing the difference file in the target device, which may detrimentally increase the costs of such receiver hardware in the target device.

The task of the invention consists in providing a method for transferring a difference file from a source device to a target device, whereby the transmission and processing of the difference file is secure and may occur with a reduced memory expenditure in the target device.

The invention provides for dividing the difference data of two images, which are determined in a difference file, into a destination memory location in a destination device, for example in a smartphone, into at least two partial blocks and to transmit them successively to the destination device In this way, on one hand it is possible to reduce the amount of data to be transmitted to the amount of the difference between two files, for example two images, and on the other hand to be able to work on the target memory in the target device with an interim memory, since it is not the entire difference file that must be communicated, but only a partial block of this difference file, which can then be temporarily stored. In an alternative embodiment, it can be envisaged that two partial blocks of the difference file can be temporarily stored in the target device. In this way, a first partial file for creation of an image in a receiver can be processed, while the second partial file can be reviewed for its integrity or its relationship to a prior processed partial file.

Furthermore, it is provided to implement resume support in order to be able to resume and/or continue processing the difference data in the receiver at every point in the data transmission. Furthermore, it is provided to implement resume support in order to be able to resume and/or continue processing the difference data in the receiver at any point in the data transmission.

For this purpose, it is provided, for example, for storing two partial blocks of the difference file in a target storage location. Thus, a first partial file can be processed for generating an image in a receiver, while the second partial file can be checked for its integrity or its reference to a previously processed partial block.

It is advantageous if a difference file is broken into more than two partial files before communication to a target memory in a receiver, such as a smart phone. In this way, the amount of data of a partial file of the difference file can be further reduced.

In order to generate a second image following a first image or update a file in a target device, a comparison of the images or the files in a source device is made to determine the differences between the images or files. From these differences, a so-called difference file is created which is usually transferred from the source device to the target device. By using this difference file and the old image or the old file already stored in the target device, the new image or the new file is created in the target device.

To reduce the need for memory in the target device, the difference file may be taken apart and transmitted in several partial blocks to the target device, whereby the transfer of the partial blocks of the difference file takes place in consecutive fashion.

Thereby only a fraction of the difference file must be stored in the memory, such as a flash memory of the target file. It is planned to test and to process a partial block after storage in order to create the second new image or the new file in the target device in stepwise fashion.

Following the processing of the current partial block, the next block may be transferred to the target device, and may be stored, tested, and processed there.

Conventional methods with a checksum or similar features may be used for checking the correctness of the transmitted partial block.

It is especially advantageous for the hash values of the partial blocks to be created in the source device and to be transferred in a prior partial block in a related header to the target device. The same thing may occur with data referring to block lengths. Thereby, during processing of a current partial block in the target device, information on the length of the block and on a hash value of a succeeding partial block can be extracted. After the receipt and storing of the following partial block, it can then be tested using the data on length and its hash value.

Generally different formation rules apply for a first and for the last partial block. So for example, a value of zero can be given as a value for the block length of the succeeding partial block, and thereby the end is indicated of the difference file that consists of several partial blocks.

Creation of the second file or of the second image in the target device occurs generally with a transfer of a difference file while maintaining partial data from the old image or from the old file, and an intentional replacement of components of the old file or the old image in order to create the new file or the new image. The information on creating the new file or the new image is contained in the difference file.

The partial blocks are provided with a header, which for example includes information on a block length of the current and succeeding partial block, on a check sum of the partial block, on coding or compressing of the partial block, and a number of the partial block, which allows setting up the partial block within the difference file. A CRC value for testing the partial file can also be provided.

The difference file divided into several partial blocks according to the method can be transferred by hard wire or wirelessly to the target device. For example, a transfer is provided via a CAN bus in a motor vehicle.

BRIEF DESCRIPTION OF THE DRAWINGS

Other individual items, characteristics, and advantages of embodiments of the invention result from the following description of examples of embodiments with reference to the relevant figures. They show.

DETAILED DESCRIPTION

Figure 1:
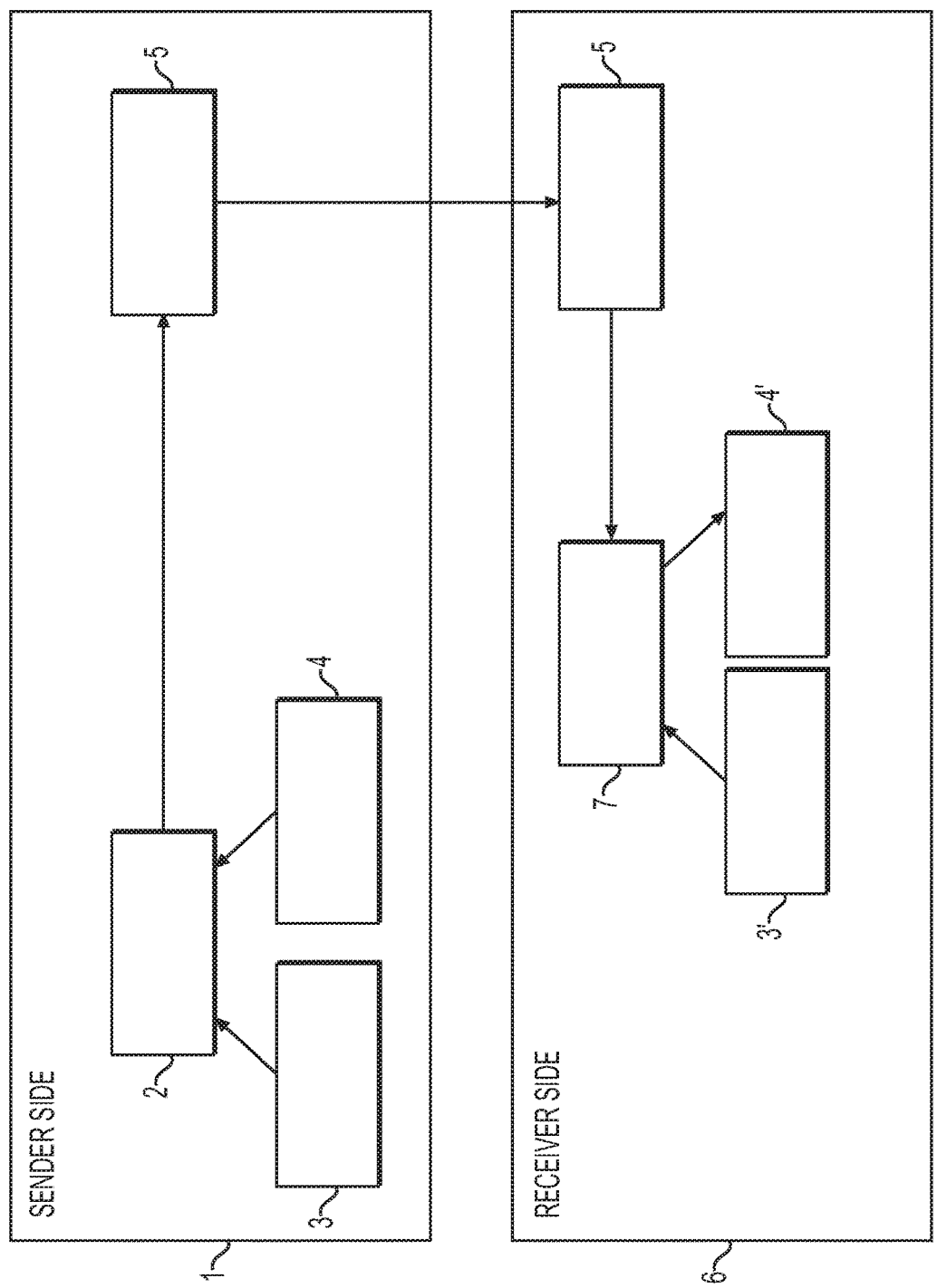
FIG. 1 is a presentation of a method for transferring a difference file according to the state of the art.

FIG. 1 shows a method for transferring a difference file according to the state of the art. In a sender side source device 1, by means of an appropriate difference tool 2, a first image 3 and a second image 4 are examined for their differences, and the discovered differences between the two images 3 and 4 are stored in a difference file 5. Hereby the first image 3 is an older image presented before image 4, or the image 4 is a new image following image 3.

Although this exemplary embodiment is limited to successively displayed images 3 and 4 as well as 3' and 4', the method for transferring a difference file 5 is, of course, also applicable to other files which are transmitted from a source device 1 to a destination device 6, such as, for example, a software update.

This difference file 5 is transferred from the source device 1 to a target device 6 for example wirelessly. The target device 6 has a patch tool 7 for creating a new second image 4' from an old first image 3' and the data from the difference file 5.

In current implementations, according to the state of the art the entire difference file 5 must be transferred to the target device 6 and stored in the latter before the patch process for processing the difference file 5 and creating the second image 4' can be begun.

As an application from the state of the art, which works according to this principle, a method for updating vehicle software is provided by Arynga, in which the difference file 5 first must be completely downloaded and then stored before it can be processed.

This invention reduces the size of the difference file 5 for the patch process for processing and for creating the necessary second image 4' in a file to be stored in an interim memory on a portion of the difference file 5. Thereby care is taken that the transfer occurs securely and reliably, and that the receiver side target device 6 can be tested before processing the received portion of the difference while 5, which is designated as partial block 8 or partial files, for example the signature of this partial block 8. Alternatively, a checksum can be used.

The difference file 5 may be divided into at least two partial blocks 8. Therefore, the size of the memory for storing the partial blocks 8, which is required in the target device 6, can be reduced with an increased number of partial blocks 8.

The partial blocks 8 may also be provided with an identifier such as a number, whereby the difference file 5, which is divided in the source device 1 can be processed in the correct serial order in the target device 6, partial block 8 by partial block 8, and thereby the new file or the new image 4' can be created.

In addition, it may be advantageous to provide the partial block 8 for example with a checksum or a hash value to test the following partial block 8. In this way a test of the proper data transfer of the partial block 8 into the target device 6 can be assured. Thus, information can be taken from a first received and stored partial block 8 in the target device 6 for numbering of the subsequent partial block 8 and for a hash value for a test sum. These are prepared in the method and can be brought in for testing after the receipt and storage of the following partial block 8.

In this way, error algorithms can be used in the case of something not agreeing, such as, for example, by requesting the following partial block 8 to be re-sent.

To reduce the data ready for transfer between the source device 1 and the target device 6, known compression techniques can be used.

In addition, chains of hash values can be created and a signature can be used in the header and/or in at least a first partial block 8.

Figure 2:
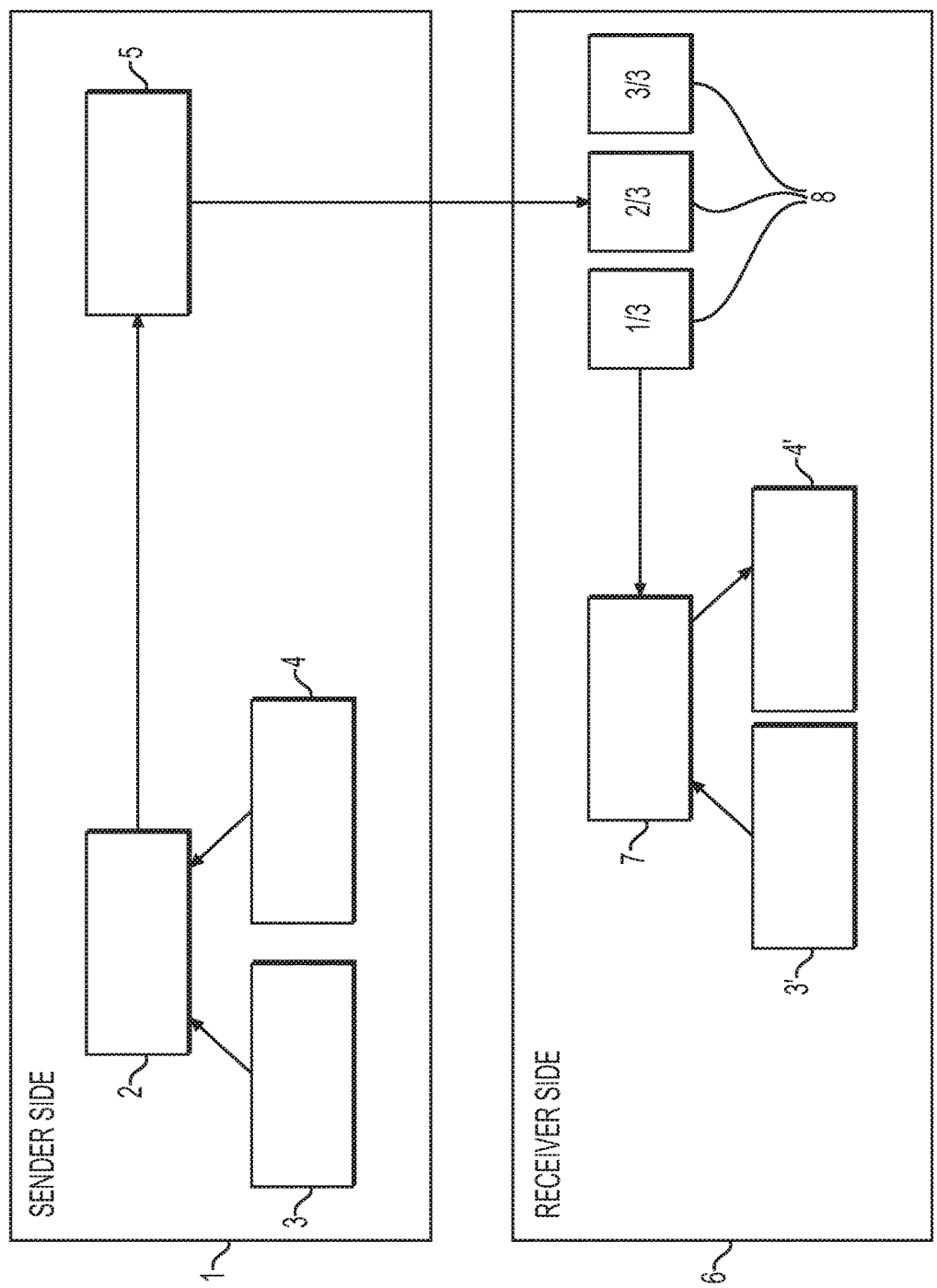
FIG. 2 is an embodiment of the method according to the invention.

FIG. 2 shows schematically a transfer of a difference file 5 created for example in three equally large partial blocks 8 to the target device 6. Preferentially, an adjustment of the number of partial blocks 8 is undertaken in a way that a partial block 8 can be stored in an available interim memory (cache) of the target device 6.

In one example of an implementation, an external flash memory 9 is used for storing a first and a second image 3 and 4, whereby the first image 3 is an old image and the second image 4 is a new image following the first image 3. In this implementation, the available internal flash drive 10 is not large enough to store the difference file 5 in its entirety.

According to an aspect, the difference file 5 is divided into partial blocks 8, whose size can be selected so that these partial blocks 8 can be stored in an internal flash memory available in the memory area.

In addition, care is taken that the transfer of the partial blocks 8 occurs consecutively in the form of partial blocks 8, and can be continued or newly begun to any desired location, for example, in the case where a disturbance of the data transfer occurs.

Figure 3:
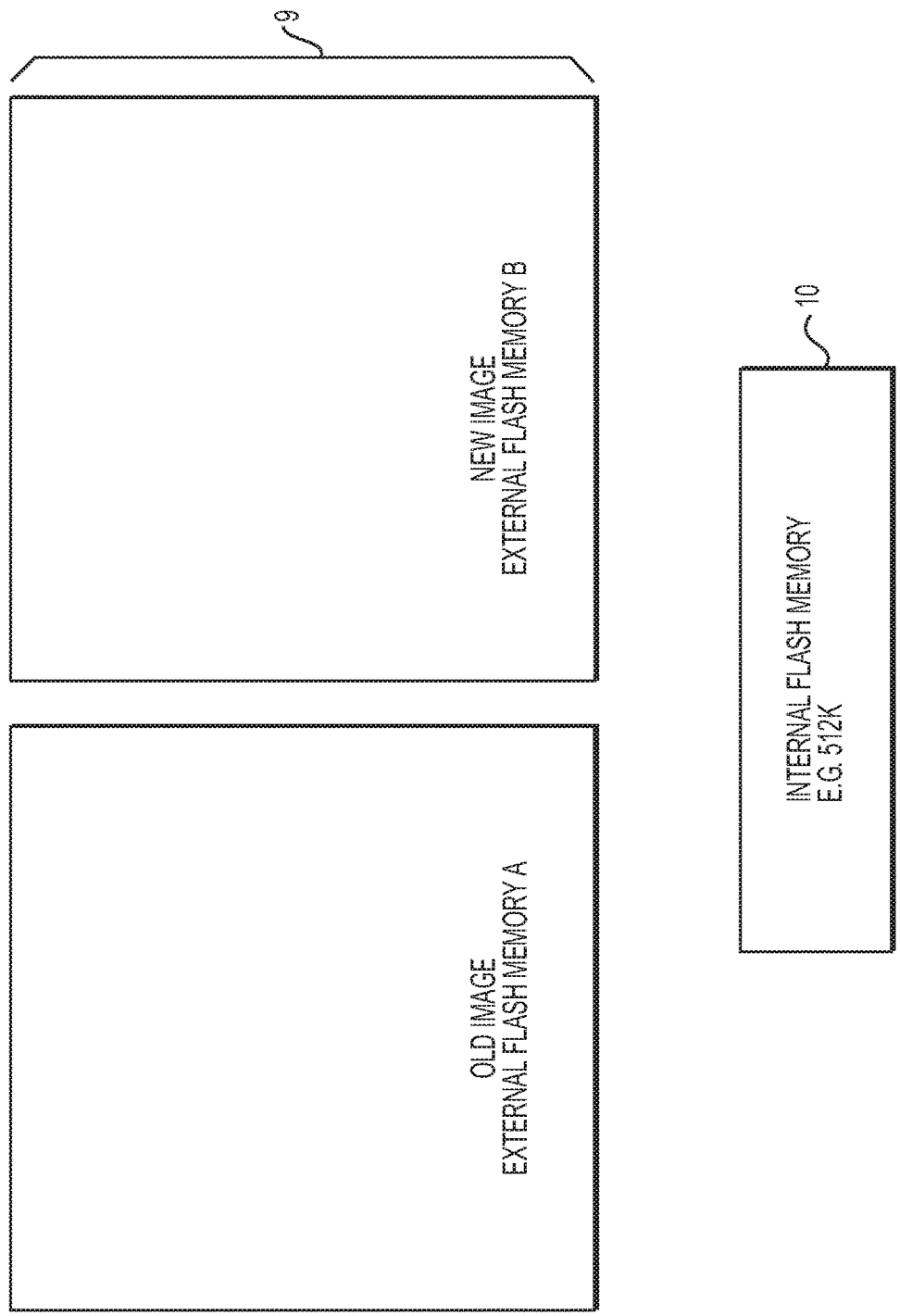
FIG. 3 is a memory set up to implement the method to transfer a difference file.

In the example in FIG. 3, two partial blocks 8 with their relevant header information may be stored in an internal flash drive 10. This header information serves to test the integrity of the transferred partial blocks 8 during the entire download process of the difference file 5.

The partial blocks 8 or data blocks are connected to one another by hash values in a way that the prior partial block 8 always includes the hash value of the following partial block 8. It is planned that the last block for the hash value and the length of the following block have a value of zero, and in this way the end of the total difference file 5 is indicated.

Every partial block 8 has stored in the header 11 the length of the next partial block 8. The block length of the partial block 8 is dynamic, because it is also planned there to compress the data to be transferred of the partial blocks 8.

An algorithm used for the compression of the data of partial blocks 8 can be chosen depending on the size of the memory and of the hardware available in the target device. Known methods such as, for example, LZSS, Deflate, or LZMA can be used.

Figure 4:
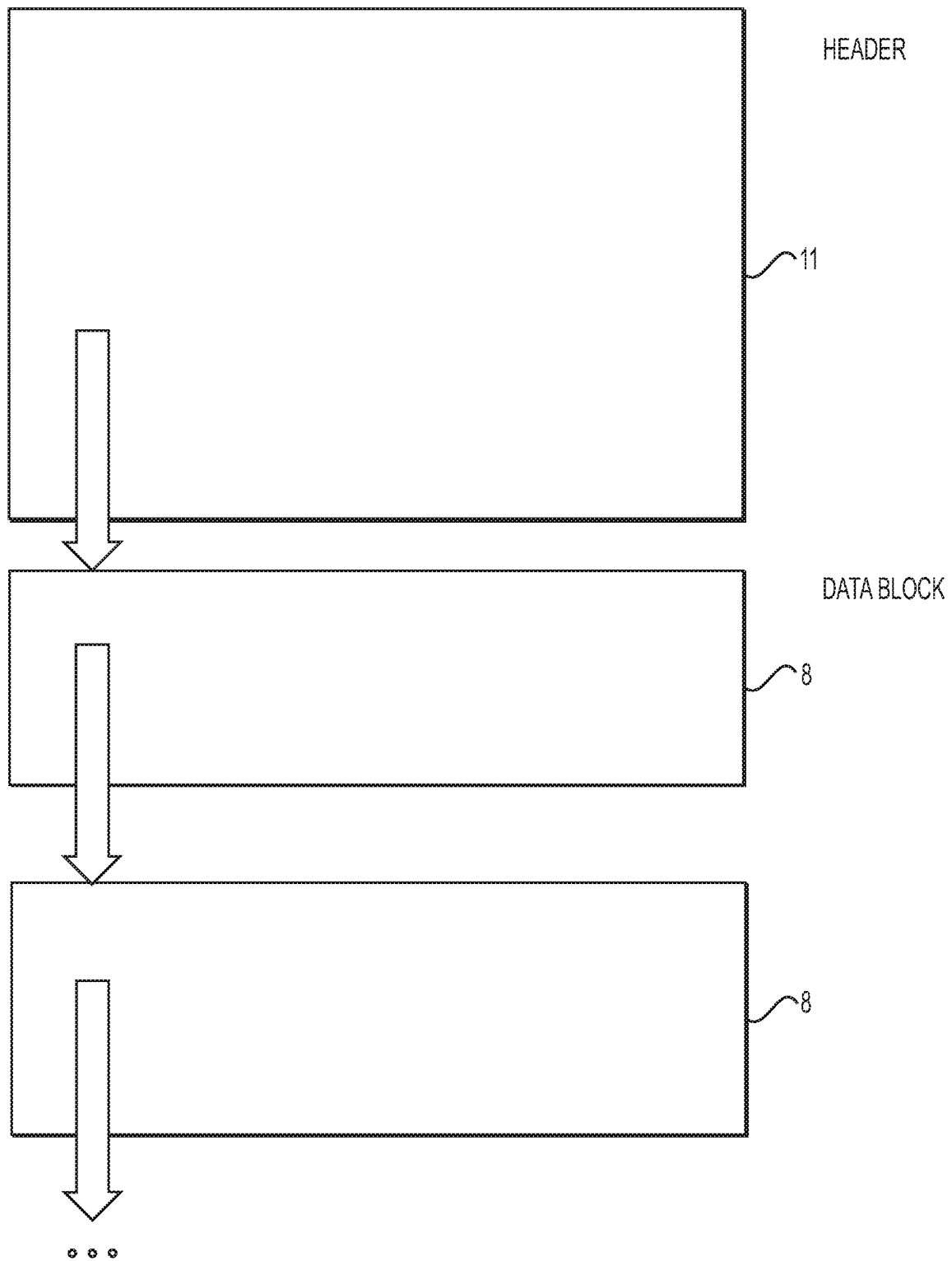
FIG. 4 is a presentation of the structure of the data transfer.

The information contained in a header 11 and in the partial blocks 8 are given as an example in FIG. 4. One may recognize the information on the entire length of the image file and other data not relevant to the method described here.

The header 11 shows for example information on the size or length of the image, other fields not relevant to the algorithm, a hash value for the next block (Hash (SHA256 or similar), data on the length of the next block (data on the length of this block), the number of blocks, the RSA signature of this block, and possibly other information.

For example, the SHA 256 algorithm (secure hash algorithm with a 256 bit signature) given here is a known and secure hash algorithm. However, other encryption and/or cryptographic hashing algorithms may be used.

A partial block 8 shown in FIG. 4 can for example contain information on a hash value of the following block (Hash (SHA256 of next block), data on the link on the next block, and data on the file compression method used an/or compressed data.

Then a hash value, for example one of type SHA526, is entered for the following partial block 8. One must also recognize the lengths of the current and following partial blocks 8. The end of the exemplary data in the header 11 form items of information for the number of partial blocks 8 and regarding an RSA signature of the current block.

In the following at least two partial blocks 8, at least the hash values, the length of the following partial block 8, and the data to be transferred are stored in compressed form.

Figure 5:
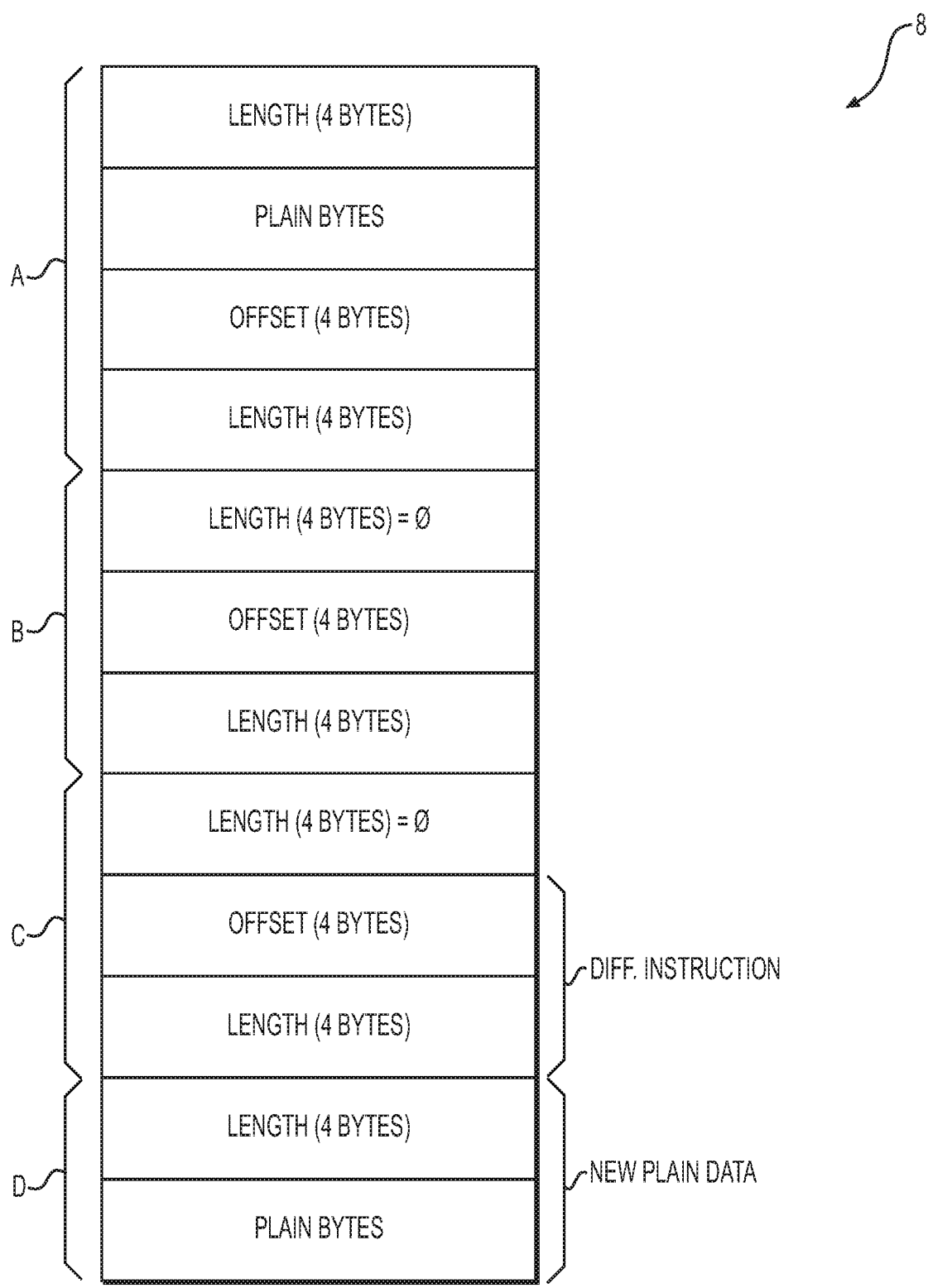
FIG. 5 is an exemplary implementation of the method according to the invention to transfer a difference file in 4-byte blocks.

The content of a partial block 8 created in this way is a series of bytes, which for example is illustrated in FIG. 5 and can be interpreted as follows.

The first 4 bytes are part of an offset, which is used to specify from which point suitable data from the old image 3 are to be copied into the new image 4. The next 4 bytes indicate the length of how many bytes are to be copied. A negative number indicates that the data should be copied from the data that has just been written.

In the example 4 bytes follow, which indicates how many bytes are to be literally copied. In this case, a zero means that no copying operation is to be carried out and that the next byte is to be understood as offset again.

The 4 bytes in FIG. 5 used in the example are a typical example, and can be adjusted as needed by a person skilled in the art. Thus, 3 or 5 bytes can also be used, as needed.

The byte length that is used for the offset and the link in the example of FIG. 5 depends on the size of the new image 4. With an image size of more than 2 GB, for example, 5 bytes are necessary.

The partial block 8 shown in FIG. 5 can consist, for example, of 12 partial areas of memory, which are grouped into segments A, B, C, and D, with each of the segments functioning as a difference instruction to instruct the target device to generate a corresponding portion of the new image 4. Each of these segments may contain four different types of information. For example, the first segment labeled A, may contain information on the length of the string buffer (4 bytes), the content of the string buffer (also called plain bytes) having a length specified, an offset of the match (i.e. information on the source of data to be written to the corresponding portion of the new image 4) (4 bytes), a length of the match (i.e., information on the number of bytes of data to be written to the corresponding portion of the new image 4) (4 bytes). A segment may have no plain data, and may only function to instruct the target to use a portion of the source image 3 to generate a corresponding portion of the new image 4. An example of a segment with no plain data is shown as segment labeled B, which includes a length of the string buffer, which contains a zero or a null value (4 bytes), an offset of the match (i.e., information on the source of data to be written to the corresponding portion of the new image 4) (4 bytes), a length of the match (i.e., information on the number of bytes of data to be written to the corresponding portion of the new image 4) (4 bytes).

Thereby, the offset (4 bytes) and the length (4 bytes) which are included in each of the segments A, B, and C are called difference instructions of the difference file 5. The last two partial areas include additional, new plain data which may be used in a subsequent difference instruction of a subsequent partial block 8.

A method is provided in which for example a download engine stores the header 11 and two partial blocks 8 in an internal flash memory 10. While the data of the first partial block 8 are already being processed to create the second image 4', the second partial block 8 is transferred to the target device 6 and stored in the internal flash memory 10. An example of this procedure is illustrated in FIG. 6.

Figure 6:
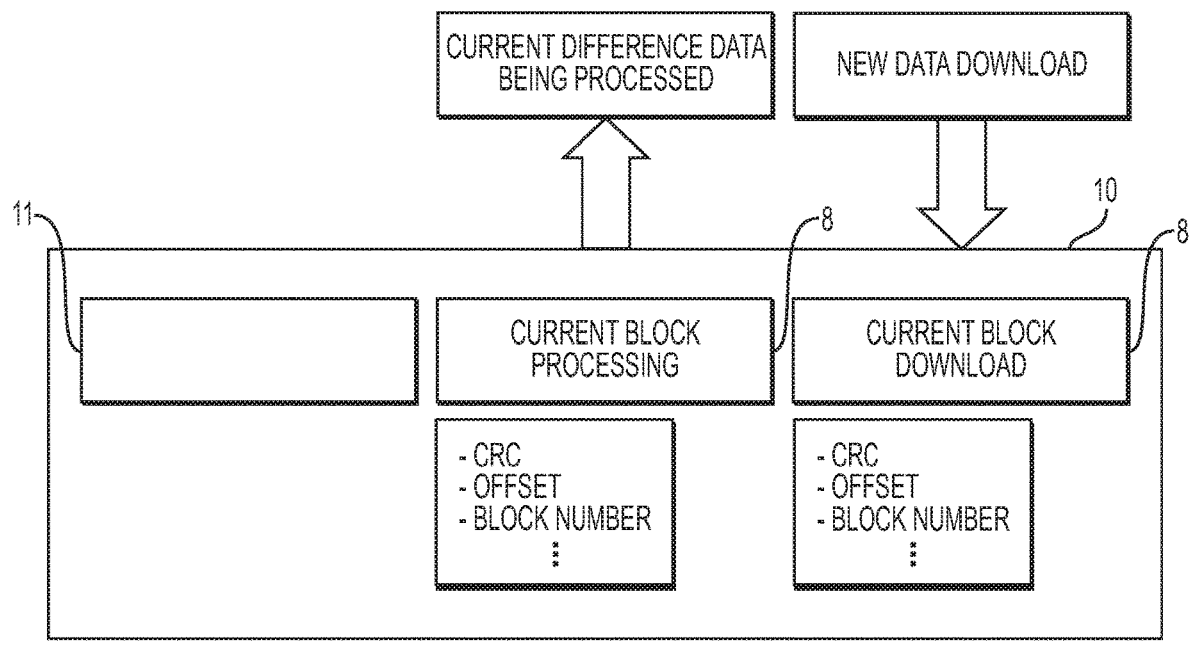
FIG. 6 is an exemplary presentation of processing the data in a relevant set up (download engine)

Within the partial blocks 8, which are stored in the internal flash memory 10 in FIG. 6, information may be contained regarding a CRC value (CRC so far), and offset (offset so far), a block number, downloaded information, checked item, processed information, and an output offset.

An example of the creation of a difference file is presented as follows:
1. Place the old and new images 3 and 4 in a memory;
2. Apply suffix sorting to the old and new images 3 and 4;
3. Create a buffer to store strings;
4. As long as the new image has not yet been processed:
   a. Perform a binary search based on the current location data, in the old and new suffix-sorted images;
   b. Select the largest or longest match;
   c. If the match is longer than 12:
      i. Output the length of the string buffer (can be 0);
      ii. Output the content of the string buffer (can also be empty);
      iii. Output the offset of the match (e.g., negative=new image 4, positive=old image 3);
      iv. Output the length of the match.
   d. Otherwise:
      i. Add the current byte to the string buffer;
      ii. If the current buffer size plus string buffer has the desired size (receive buffer size 12) then save the current output buffer for further processing.
5. Determine the remaining string buffer.
6. For all buffers, start with the last:
   a. Compress;
   b. Calculate the hash value;
   c. Specify the hash value to the next buffer (if not the last buffer);
   d. Specify the length of the next buffer (if last is zero);
7. Create header information that contains the hash value of the first buffer and sign the header.
8. Save the header and all buffers.

According to an aspect, any known transfer protocol may be used for downloading the difference file 5 from the source device 1 to the target device 6. Advantageously, such protocols should have the possibility of checking a complete data transfer and of checking completion of the data transfer after an interruption. For example, in the area of motor vehicle technology, the known CAN protocol may be implemented. Other protocols, such as MOST and UDP, which also can transfer data with various file sizes or lengths, are also envisaged for use.

Figure 7:
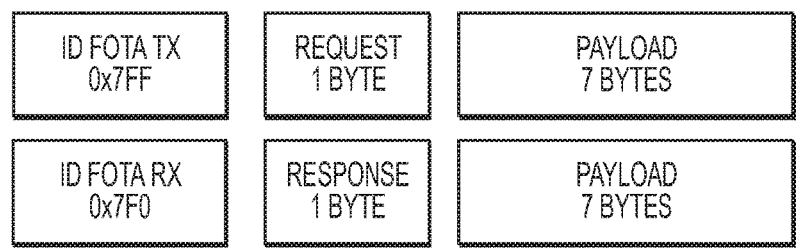
FIG. 7 is an exemplary presentation of an implementation of the method by using the CAN protocol.

FIG. 7 shows an exemplary implementation of the CAN protocol. The following questions and answers are defined accordingly. Two CAN identifiers are used, FotaRX (Receive Firmware over-the-air) (from the source device 1 to the target device 6) and FotaTX (Transmit Firmware over-the-air) (from the target device 6 to the source device 1). It is suggested that the CAN identifier lie in the area 0x7FF and 0x7F0. In this way, it is assured that other information is not disturbed. Usually information for the case where data losses have occurred is transferred again.

For example, in each case there is one bite for one request (request/1 byte) and 7 bytes for the following use information (payload/7 bytes).

The use of the CAN protocol is only exemplary. Other transport protocols, such as UDS/ISO-TP and others may also be used as part of the invention.

In order to process a partial block 8, it may be first checked with the hash value from the prior partial block 8. If this check is successful, a flag is set, which indicates that the current partial block 8 has been successfully checked. If it is determined in the check that the hash value does not agree, the processing is interrupted. An error routine may be started, which may request the source to re-send the partial block 8.

In a check is successful, the prior partial block 8 and any information on a block number, a CRC value, or an offset is deleted, then the transfer of the current partial block 8 may be continued. The current partial block 8 is now stored in RAM memory and decompressed.

Processing of the partial blocks 8 can occur in the form of a program loop, for example, in this way:

Reading a length of what are called plain bytes;
Copying the remaining plain bytes into an output buffer;
Reading the offset value;
Reading the length;
For a case where the length is negative, copying the bites given in the length from the new image into the output buffer;
If not, copying the bytes given in the length from the old image into the output buffer;
Repeating the procedure until all data are processed.

It is provided that the partial blocks 8 are transferred consecutively, or one after the other, checked, and processed until all partial blocks 8 of a complete difference file 5 are processed, and thereby the new file or the new image 4' has been created in the target device 6.

After all the partial blocks 8 of the image to be created are downloaded and processed, for example a check of the image 4' or the file that is created can be undertaken using an embedded signature in the image. Such a signature can also be stored in the header 11.

The invention also allows for the use of a difference file 5 in cases where the memory available is too small for the difference file 5 to be able to be stored completely in the memory of a target device 6. It is provided to transfer and process the partial blocks 8 of the divided difference file 5 consecutively, whereby an exact ordering of the series of partial blocks 8 is necessary in order to be able to process these in the correct order in the target device 6. In addition, it is planned to assure the accuracy of the received partial blocks 8 using standard checking possibilities, such as a hash value. In addition, the partial blocks 8 can be compressed using known methods in the source device 1 before their transfer.

What is claimed is:

1. A system comprising:
   a processor configured to:
   sort a first file on a source device using a suffix-sorting to create a first suffix-sorted image;
   sort a second file on the source device using a suffix-sorting to create a second suffix-sorted image;
   identify differences between the first file and the second file based on the first suffix-sorted image and the second suffix-sorted image;
   generate a difference file based on the identified differences between the first file and the second file;
   divide the different file into a least two blocks;
   for each of the at least two blocks, creating header information that indicates, at least, a length and a hash value of a respective block, and
   transfer the at least two blocks of the difference file one at a time in sequential order to a target device, wherein the source device divides the different file into the at least two blocks before transferring the difference file to the target device;
   the target device being configured to:
   receive the difference file; and
   create, on the target device, a new copy of the second file using the difference file and the first file,
   wherein the target device creates the new copy of the second file incrementally using the at least two blocks, wherein the target device begins to create the new copy of the second file before the entire difference file is transferred to the target device, new the target device, while processing a first block of the at least two blocks identifies a length and a hash value for a second block of the at least two blocks, using header information of the first block, and wherein the target device identifies the length and the hash value of the second block before the target device receives the second block.

2. The system of claim 1, wherein each of the blocks includes at least one difference instruction for instructing the target device to generate a corresponding portion of the second file.

3. The system of claim 1, wherein the second file in the target device is generated by the target device by consecutively processing all the blocks of the difference file.

4. The system of claim 1, further including a number assigned to each of the blocks, which designates a position within the difference file.

5. The system of claim 1, further including a checksum value assigned to each of the blocks for verifying a successful transfer of each of the blocks to the target device.

6. The system of claim 5, wherein said checksum is a CRC value.

7. The system of claim 1, wherein each of the blocks includes the length of a next one of the blocks, and wherein each of the blocks includes a hash value of the next one of the blocks.

8. The system of claim 1, wherein the blocks are transferred to the target device via a CAN bus.

9. The system of claim 1, wherein the target device is configured to process a first block while simultaneously receiving and storing a second block.

10. The system of claim 1, wherein the target device is configured to resume processing of the blocks after a delay of a period of time since receiving a previous one of the blocks.

11. A method for creating a difference file for generating a second file using a first file in a target device, said method comprising:
   loading the first file and the second file in a non-transitory computer readable storage;
   sorting the first file using a suffix-sorting to create a first suffix-sorted image in a non-transitory computer readable storage;
   sorting the second file using a suffix-sorting to create a second suffix-sorted image in a non-transitory computer readable storage;
   creating an output buffer in a non-transitory computer readable storage;
   repeating for as long as the second has not yet been completely generated:
   a. performing a binary search based on the current location data in the old and new suffix-sorted images;
   b. selecting the longest match that results from the binary search;
   c. if the length of the longest match is longer than a predetermined block length:
      i. Output the length of the string buffer to the output buffer;
      ii. Output the content of the string buffer to the output buffer;
      iii. Output the offset of the match to the output buffer;
      iv. Output the length of the match to the output buffer;
   d. if the length of the longest match is not longer than the predetermined block length:
      i. add the current byte to the string buffer;

e. if the current output buffer size plus the length of the string buffer has the desired size then save the current output buffer for further processing;
output the remaining string buffer to the output buffer;
for all output buffers, start with the last of the output buffers and:
   a. compress the data contained in the output buffer;
   b. calculate the hash value of the compressed data contained in the output buffer;
   c. specify the hash value of the next buffer (if not the last buffer);
   d. specify the length of the next buffer (if not the last buffer);
creating header information that contains the hash value of the first output buffer; signing the header;
saving the header and all buffers as the difference file.

12. A method, the method comprising:
sorting a first file on a source device using a suffix-sorting to create a first suffix-sorted image in a non-transitory computer readable medium;
sorting a second file on the source device using a suffix-sorting to create a second suffix-sorted image in a non-transitory computer readable medium;
identifying differences between the first file and the second file based on the first suffix-sorted image and the second suffix-sorted image;
generating a difference file based on the identified differences between a the first file and the second file;
dividing the different file into a first block and a second block;
creating, for the first block, header information that indicates, at least, a length and a hash value for the first block;
creating, for the second block, header information that indicates, at least, a length and a hash value for the second block;
receiving, at a target device, the first block and the header information of the difference file;
receiving, by the target device, the difference file;
checking, by the target device, the first block using at least the length included in the header information of the first block;
checking, by the target device, the first block using a checksum included in the header information;
processing, by the target device, the first block to create, on the target device, a new copy of a corresponding portion of the second file using the first file and a difference instruction of the first block; and
receiving, by the target device, the second block at the same time as the target device is processing the first block, wherein the target device, while processing the first block identifies the length and the has value of the second block using the header information of the first block, and wherein the target device identifies the length and the hash value of the second block before the target device receives the second block.

13. The method of claim 12, wherein each of the first block and the second block includes at least one difference instruction for instructing the target device to generate a corresponding portion of the second file.

14. The method of claim 12, further comprising consecutively processing, by the target device, at least the first block and the second block of the difference file to generate the second file on the target device.

15. The method of claim 12, wherein each of the first block and the second block includes an assigned number, which designates a position within the difference file.

16. The method of claim 12, wherein each of the first block and the second block includes an assigned checksum value for verifying a successful transfer of the first block and the second block to the target device.

17. The method of claim 16, wherein said checksum is a CRC value.

18. The method of claim 12, wherein each of the first block and the second block includes a length of a respective next one of the blocks, and wherein each of the first block and the second block includes a hash value of the respective next one of the blocks.

19. The method of claim 12, wherein each of the first block and the second block are transferred from the source device to the target device via a CAN bus.

20. The method of claim 12, further comprising processing, by the target device, the first block while simultaneously storing the second block.

* * * * *